US011564349B2

(12) United States Patent
Bonefas et al.

(10) Patent No.: US 11,564,349 B2
(45) Date of Patent: Jan. 31, 2023

(54) CONTROLLING A MACHINE BASED ON CRACKED KERNEL DETECTION

(71) Applicant: Deere & Company, Moline, IL (US)

(72) Inventors: Zachary T. Bonefas, Grimes, IA (US); Niels Dybro, Sherrard, IL (US)

(73) Assignee: Deere & Company, Moline, IL (US)

( * ) Notice: Subject to any disclaimer, the term of this patent is extended or adjusted under 35 U.S.C. 154(b) by 865 days.

(21) Appl. No.: 16/516,812

(22) Filed: Jul. 19, 2019

(65) Prior Publication Data

US 2020/0128735 A1    Apr. 30, 2020

Related U.S. Application Data

(60) Provisional application No. 62/753,541, filed on Oct. 31, 2018.

(51) Int. Cl.
| | |
|---|---|
| *A01D 41/127* | (2006.01) |
| *A01D 43/08* | (2006.01) |
| *A01D 43/10* | (2006.01) |
| *A01D 82/00* | (2006.01) |
| *A01D 45/02* | (2006.01) |

(52) U.S. Cl.
CPC ......... *A01D 41/127* (2013.01); *A01D 43/085* (2013.01); *A01D 43/102* (2013.01); *A01D 45/02* (2013.01); *A01D 82/00* (2013.01); *A01D 41/1277* (2013.01)

(58) Field of Classification Search
CPC .............. A01D 41/127; A01D 41/1277; A01D 43/085; A01D 43/102; A01D 82/00; A01D 82/02; A01D 45/02
See application file for complete search history.

(56) References Cited

U.S. PATENT DOCUMENTS

| | | |
|---|---|---|
| 4,713,781 A | 12/1987 | Brizgis et al. |
| 4,975,863 A | 12/1990 | Sistler et al. |
| 6,449,932 B1 | 9/2002 | Cooper et al. |
| (Continued) | | |

FOREIGN PATENT DOCUMENTS

| | | | |
|---|---|---|---|
| BE | 1026506 A1 * | 5/2019 | ........... A01D 43/085 |
| CN | 104792804 A | 7/2015 | |
| (Continued) | | | |

OTHER PUBLICATIONS

Drying of White Food Corn for Quality, https://www.extension.purdue.edu/extmedia/GQ/GQ34/GQTF-34.html (no date), obtained on Jul. 19, 2019, 5 pages.
NF99-405 Processing Corn Grain for Diary Cows, http://digitalcommons.unl.edu/cgi/viewcontent.cgi?article=1258&context=extensionhist, 1999, 5 pages.
(Continued)

*Primary Examiner* — Alicia Torres
(74) *Attorney, Agent, or Firm* — Joseph R. Kelly; Kelly, Holt & Christenson, PLLC

(57) ABSTRACT

An image capture device captures an image of crop after it has been processed by a kernel processing unit on a forage harvester. A size distribution indicative of the distribution of kernel fragment sizes in the harvested crop is identified from the image captured by the image capture device. A control system generates control signals to control a speed differential in the speed of rotation of kernel processing rollers based on the size distribution. Control signals can also be generated to control a size of a gap between the kernel processing rollers.

20 Claims, 14 Drawing Sheets

(56) References Cited

U.S. PATENT DOCUMENTS

| | | |
|---|---|---|
| 7,268,861 B2 | 9/2007 | Treado et al. |
| 7,656,371 B2 | 2/2010 | Shimizu et al. |
| 8,045,168 B2 | 10/2011 | Missotten et al. |
| 8,056,309 B2 * | 11/2011 | Vandendriessche .... A01F 29/10 56/16.4 B |
| 8,086,378 B2 | 12/2011 | Behnke |
| 8,139,824 B2 | 3/2012 | Missotten et al. |
| 8,218,912 B2 | 7/2012 | Missotten et al. |
| 8,554,424 B2 | 10/2013 | Kormann et al. |
| 8,600,545 B2 | 12/2013 | Earlam |
| 8,626,406 B2 | 1/2014 | Schleicher et al. |
| 8,635,840 B2 | 1/2014 | Behnke |
| 8,831,292 B2 | 9/2014 | Brueckner et al. |
| 9,723,784 B2 * | 8/2017 | Bremer .............. G01N 33/0098 |
| 2005/0186997 A1 | 8/2005 | Ho et al. |
| 2012/0123650 A1 | 5/2012 | Diekhans et al. |
| 2015/0009328 A1 | 1/2015 | Escher et al. |
| 2016/0029561 A1 | 2/2016 | Fischer et al. |
| 2016/0078304 A1 | 3/2016 | Bremer et al. |
| 2016/0189007 A1 | 6/2016 | Wellington et al. |
| 2017/0049053 A1 | 2/2017 | Bonefas et al. |

FOREIGN PATENT DOCUMENTS

| | | |
|---|---|---|
| EP | 1166619 B1 | 1/2002 |
| EP | 2098109 B1 | 9/2009 |
| EP | 2232978 A1 | 9/2010 |
| EP | 3138383 A1 | 3/2017 |
| IN | 02449DE2012 A | 2/2014 |

OTHER PUBLICATIONS

Kernel Processed Corn Silage http://www.milkproduction.com/Library/Scientific-articles/Nutrition/Kernel-processed-corn-silage, Oct. 2, 2000, 6 pages.

Measurement of corn mechanical damage using dialectric properties http://lib.dr.iastate.edu/cgi/viewcontent.cgi?article=1377&context=abe_eng_conf, Jul. 2001, 16 pages.

Tim Meister, "How to Get Better Kernel Processor Results", 1 page, Jul. 16, 2009.

S. Gunasekaran et al. "Size Characterization of Stress Cracks in Corn Kernels", 1985 American Society of Agricultural Engineers, 5 pages.

European Search Report issued in counterpart European Patent Application No. 19206086.1 dated Mar. 12, 2020 (7 pages).

* cited by examiner

CONTROLLING A MACHINE BASED ON CRACKED KERNEL DETECTION

CROSS-REFERENCE TO RELATED APPLICATION

The present application is based on and claims the benefit of U.S. provisional patent application Ser. No. 62/753,541, filed Oct. 31, 2018, the content of which is hereby incorporated by reference in its entirety.

FIELD OF THE DESCRIPTION

The present description relates to a forage harvester. More specifically, the present description relates to controlling a kernel processor in a forage harvester

BACKGROUND

There are many different types of agricultural harvesting machines. One such machine is a forage harvester.

A forage harvester is often used to harvest crops, such as corn, that is processed into corn silage. In performing this type of processing, the forage harvester includes a header that severs the corn stalks from the roots and a cutter that cuts the plants into relatively small pieces. A kernel processing unit includes two rollers that are positioned with a gap between them that receives the cut crop. The gap is sized so that, as the cut crop travels between the kernel processing rollers, they crush the kernels into smaller pieces or fragments.

The rollers often operate at different speeds. In this way, as material passes between them, the rollers produce a grinding effect as well. This type of kernel processing operation affects the feed quality of the corn silage. For instance, kernels that have been broken into small pieces by the kernel processing unit are more digestible to dairy cattle and thus result in higher milk production. Kernels that are unbroken, or that are broken into relatively large pieces, are less digestible.

However, processing kernels in this way also uses a significant amount of the overall machine horse power. The power used to process kernels varies significantly with the size of the gap between the kernel processing rollers and the speed differential of the rollers.

One metric that is currently used to quantify the efficacy of a machine's kernel processing unit is known as the Corn Silage Processing Score (CSPS). In determining the CSPS value, a sample of silage is usually sent to a laboratory, where the sample is first dried, and then sieved through a machine which has a number of different sieves, with different hole sizes. The sieved material is then evaluated. The kernel portion that falls through a 4.75 mm sieve is the numerator of the CSPS, and the total kernel portion that was sieved is the denominator in the CSPS. Thus, the more of the kernel portion that falls through the 4.75 mm sieve, the higher the value of the CSPS metric.

Given this method, it is very difficult to use the CSPS metric value for anything, except determining the quality of the silage, after it is harvested. This can be used to determine the level of supplements that should be fed to the dairy cattle that will be consuming the silage.

The discussion above is merely provided for general background information and is not intended to be used as an aid in determining the scope of the claimed subject matter.

SUMMARY

An image capture device captures an image of crop after it has been processed by a kernel processing unit on a forage harvester. A size distribution indicative of the distribution of kernel fragment sizes in the harvested crop is identified from the image captured by the image capture device. A control system generates control signals to control a speed differential in the speed of rotation of kernel processing rollers based on the size distribution. Control signals can also be generated to control a size of a gap between the kernel processing rollers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
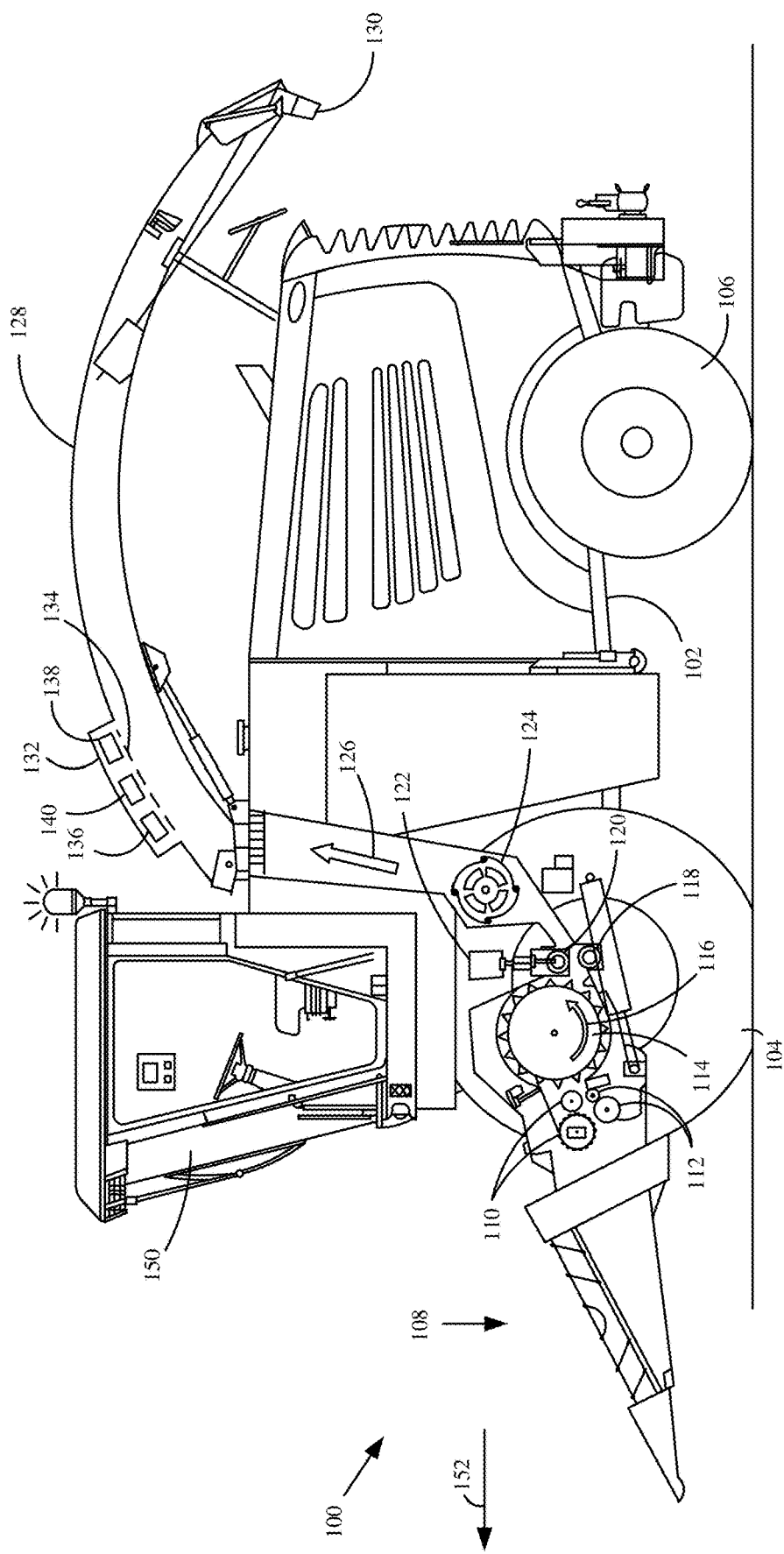
FIG. 1 is a partial pictorial, partial schematic view of a forage harvester.

FIG. 1 is a partial pictorial, partial sectional view of a forage harvester 100. Forage harvester 100 illustratively includes a mainframe 102 that is supported by ground engaging elements, such as front wheels 104 and rear wheels 106. The wheels 104, 106 can be driven by an engine (or other power source) through a transmission. They can be driven by individual motors (such as individual hydraulic motors) or in other ways.

FIG. 1 shows that, in the example illustrated, forage harvester 100 includes operator compartment 150. Operator compartment 150 has a plurality of different operator interface mechanisms that can include such things as pedals, a steering wheel, user interface display devices, touch sensitive display screens, a microphone and speech recognition components, speech synthesis components, joysticks, levers, buttons, as well as a wide variety of other mechanical, optical, haptic or audio interface mechanisms. During operation, the machine moves in the direction generally indicated by arrow 152.

A header 108 is mounted on the forward part of forage harvester 100 and includes a cutter that cuts or severs the crop being harvested, as it is engaged by header 108. The crop is passed to upper and lower feed rolls 110 and 112, respectively, which move the harvested material to chopper 114. In the example shown in FIG. 1, chopper 114 is a rotatable drum with a set of knives mounted on its periphery, which rotates generally in the direction indicated by arrow 116. Chopper 114 chops the harvested material received through rollers 110-112, into pieces, and feeds it to a kernel processing unit which includes kernel processing rollers 118 and 120. The kernel processing rollers 118 and 120 are separated by a gap and are driven by one or more different motors (shown in FIG. 2) which can drive the rollers at different rotational speeds. Therefore, as the chopped, harvested material is fed between rollers 118 and 120, the rollers crush and grind the material (including the kernels) into fragments.

In one example, at least one of the rollers 118 and 120 is mounted for movement under control of actuator 122. Actuator 122 can be an electric motor, a hydraulic actuator, or any other actuator which drives movement of at least one of the rollers relative to the other, to change the size of the gap between rollers 118 and 120 (the kernel processing gap). When the gap size is reduced, this can cause the kernels to be broken into smaller fragments. When the gap size is increased, this can cause the kernels to be broken into larger fragments, or (if the gap is large enough) even to remain unbroken. The kernel processing rollers 118 and 120 can have surfaces that are relatively cylindrical, or the surfaces of each roller can have fingers or knives which protrude therefrom, and which cooperate with fingers or knives of the opposite kernel processing roller, in an interdigitated fashion, as the rollers turn. These and other arrangements or configurations are contemplated herein.

The processed crop is then transferred by rollers 118-120 to conveyor 124. Conveyor 124 can be a fan, or auger, or other conveyor that conveys the harvested and processed material upwardly generally in the direction indicated by arrow 126 through chute 128. The crop exits chute 128 through spout 130.

In the example shown in FIG. 1, chute 128 includes an image capture housing 132 disposed on the side thereof. If can be separated from the interior of chute 128 by an optically permeable barrier 134. Barrier 134 can be, for instance glass, plastic, or another barrier that permits the passage of at least certain wavelengths of light therethrough. Housing 132 illustratively includes a radiation source 136, a radiation sensor 138, and an image capture device 140. Radiation source 136 illustratively illuminates the crop passing through chute 128 with radiation. Radiation sensor 132 detects radiation that is fluoresced or otherwise transmitted from the crop, and image capture device 140 captures an optical image of the crop. Based on the image and the sensed radiation, a size distribution indicative of the distribution of the size of the kernels or kernel fragments in the harvested crop passing through chute 128 is identified. This is described in greater detail below. It can be passed to a control system which controls the speed differential of rollers 118 and 120, and/or the size of the gap between rollers 118 and 120 based upon the size distribution of kernels and kernel fragments.

It will also be noted that, in another example, instead of having the sensors in housing 132 sense characteristics of the crop passing through chute 128, a sample of the crop can be diverted into a separate chamber, where its motion is momentarily stopped so the image can be taken and the characteristics can be sensed. The crop can then be passed back into the chute 128 where it continues to travel toward spout 130. These and other arrangements and configurations are contemplated herein.

Figure 2:
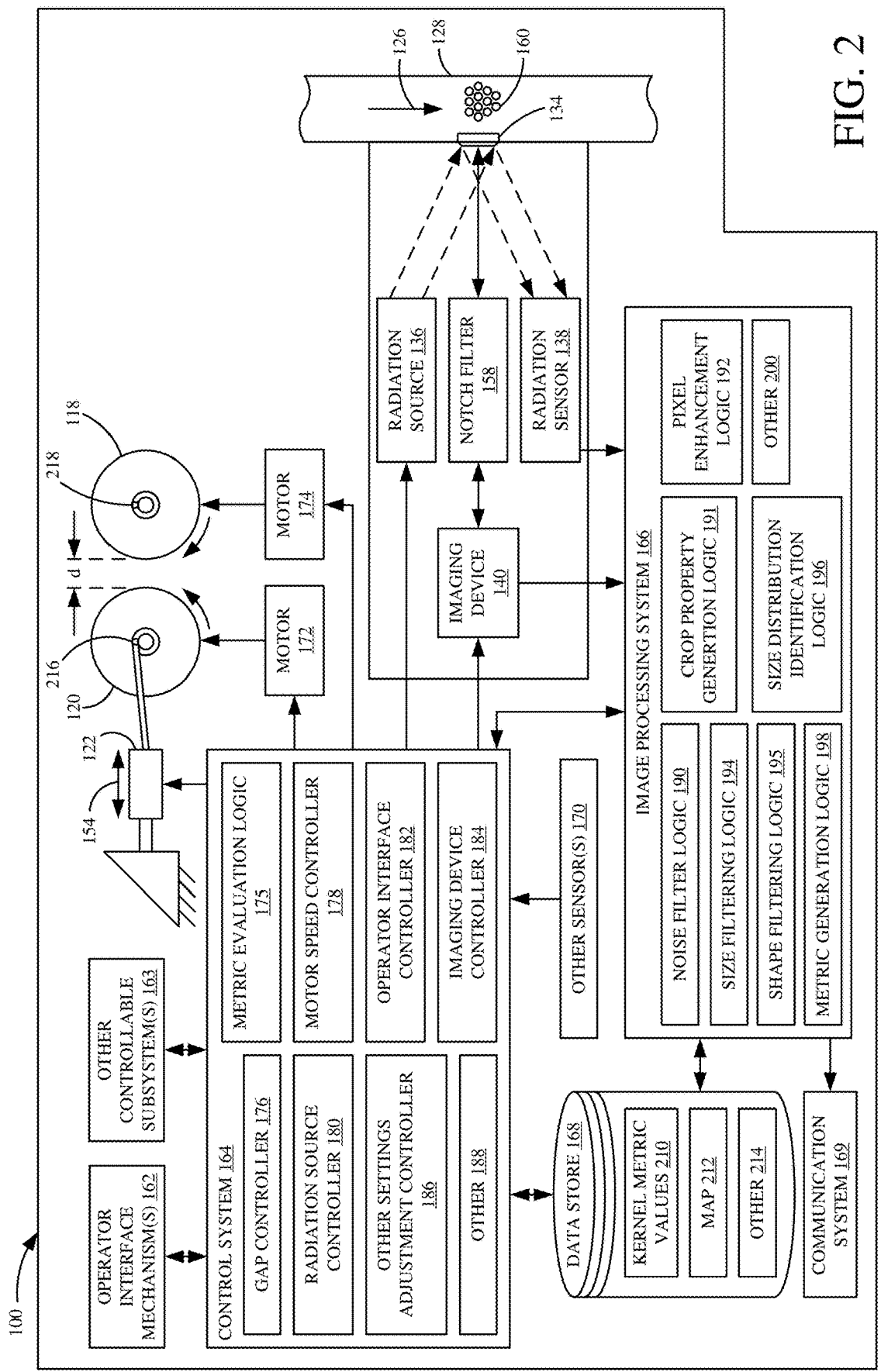
FIG. 2 is a block diagram showing one example of items in the forage harvester illustrated in FIG. 1.

FIG. 2 is a block diagram showing some parts of forage harvester 100 in more detail. Some of the items illustrated in FIG. 2 are similar to those shown in FIG. 1, and they are similarly numbered. Therefore, FIG. 2 shows, schematically, that crop passes through a gap having a width "d" between kernel processing rollers 118 and 120. An actuator 122 can be actuated to move generally in the direction indicated by arrow 154 to change the size of gap "d" between rollers 118 and 120. After the crop is processed by rollers 118 and 120, it enters chute 128 where it passes housing 132 which contains imaging device 140, radiation source 138 and radiation sensor 136, all of which are separated from the interior of chute 128 by barrier 134. The example shown in FIG. 2 shows that, in one example, a notch filter 158 (which receives radiation emitted from the crop sample 160), is disposed between barrier 134 and imaging device 140.

FIG. 2 also shows a number of other items in more detail. For instance, FIG. 2 includes operator interface mechanisms 162, other controllable subsystems 163, control system 164, image processing system 166, data store 168, communication system 169, a variety of other sensors 170, and one or more motors 172-174. As briefly discussed above, operator interface mechanisms 162 can include a wide variety of different operator interface mechanisms that generate outputs for an operator, and that allow an operator to provide inputs to control forage harvester 100. Control system 164 illustratively includes metric evaluation logic 175, gap controller 176, motor speed controller 178, radiation source controller 180, operator interface controller 182, imaging device controller 184, other settings adjustment controller 186, and it can include a wide variety of other items 188.

Image processing system 166 can include noise filter logic 190, crop property generation logic 191, pixel enhancement logic 192, size filtering logic 194, shape filtering logic 195, size distribution identification logic 196, metric generation logic 198, and it can include a wide variety of other items 200. Data store 168 can include kernel metric values 210, map 212, and a wide variety of other items 214. Before describing the overall operation of forage harvester 100, illustrated in FIG. 2, a brief description of some of the items in forage harvester 100, and their operation, will first be provided.

Metric evaluation logic 175 evaluates metrics generated by metric generation logic 198 (described below) to determine whether any adjustments need to be made to the known processing unit or other items. Gap controller 176 illustratively generates control signals to control actuator 122 which, in turn, drives movement of roller 120 relative to roller 118 to change the size of gap "d". Actuator 122 can be a linear actuator, it can be an electric or hydraulic actuator, or another type of actuator.

Motor speed controller 178 illustratively generates motor control signals to control motors 172 and 174 to thereby control the speed (and hence the speed differential) of rollers 118 and 120. In another example, rollers 118 and 120 can be driven by a single motor and the speed differential can be controlled by controlling a transmission or gears that connect the motor to the rollers. Each of rollers 118 and 120 also illustratively includes a torque sensor 216 and 218, respectively. Torque sensors 216 and 218 illustratively sense the torque in driving rollers 118 and 120, and generate a torque output signal that is provided to control system 164, indicative of the sensed torque. The torque is thus indicative of the power consumed in driving rollers 118 and 120.

Radiation source controller 180 illustratively controls radiation source 136 to emit a pulse of radiation which irradiates the crop sample 160 then traveling through chute 128. The endosperm of corn kernels in crop sample 160, when exposed to ultraviolet light of approximately 253.6 nanometers, fluoresces light at an emission wavelength of approximately 335 nanometers. Therefore, in one example, radiation source 136 is an ultraviolet-C (UV-C) light source that emits radiation centered on 254 nanometers in wavelength. Radiation sensor 138 is illustratively a near infrared sensor that senses near infrared light reflected off the crop sample 160. The reflected light can be refracted into wavelength-dependent directions onto a sensor array comprising radiation sensor 138. Crop property generation logic 191 receives sensor signals indicative of the reflected radiation from sensor 138 and processes those signals to obtain crop properties indicative of properties of the crop sample 160. The crop properties can include things such as moisture, starch content, acid detergent fiber, neutral detergent fiber, among other things.

Image device controller 184 controls imaging device 140 to capture an image of the crop sample 160 as it is being irradiated (or illuminated) by radiation source 136. Imaging device 140 is illustratively a camera or other imaging device that is sensitive to radiation in the ultraviolet spectrum. In one example, imaging device controller 184 controls imaging device 140 to capture an image (e.g., where device 140 is a camera, it controls device 140 to open its shutter) of crop sample 160. During the image capturing process (e.g., while the shutter is open) radiation source controller 180 controls radiation source 136 to emit a brief pulse of UV-C light from light emitting diodes (LEDs) or another source to illuminate the crop stream (e.g., sample 160) and freeze its motion in the image as it flows by at a relatively high rate of speed within chute 128. Notch filter 158 is illustratively configured as an optical notch filter that allows light centered on approximately 335 nanometer in wavelength (the wavelength at which the cracked kernels fluoresce) to pass from crop sample 160 to imaging device 140. As briefly mentioned above, the sample 160 can also be diverted out of chute 128 and momentarily captured (where its motion is stopped) so that the image can be taken, and then released back into the stream of crop flowing through chute 128.

The image captured by imaging device 140 is then transferred to image processing system 166. Noise filter logic 190 filters noise from the image and pixel enhancement logic 192 enhances pixels in the image. Size filtering logic 194 filters the kernel fragments in the image based on size so that if a particle believed to be a kernel fragment that is much larger or smaller than an expected size shows up in the image, it is filtered out. Shape filtering logic 195 filters the image based on shape so that if a particle in the image has a shape that is very likely not a kernel fragment, it is filtered out as well. Size distribution identification logic 196 then identifies a size distribution of the kernels or kernel fragments remaining in the image, and metric generation logic 198 generates a metric based on the size distribution. The metric can include a wide variety of different types of metrics and combinations of metrics. For instance, the metric can be the distribution of kernel or fragment size, the CSPS value over time, a map of the CSPS values over the harvested area (e.g., over the field being harvested) when combined with position information from another sensor 170 (such as a GPS receiver).

Metric generation logic 198 can generate graphs that describe a relationship between fuel consumption per mass of harvested material and the gap "d" between kernel processing rollers 118 and 120 and/or the speed differential of rollers 118 and 120. Torques can be provided in order to assess fuel consumption, or separate sensors indicative of fuel consumption can be sensed as well. Similarly, the speed of rotation of rollers 118 and 120 can be provided by sensing the speed of motors 172 and 174 or in other ways. The gap size "d" can be provided from gap controller 176, from a sensor indicative of the extent of actuation of actuator 122, or in other ways. These, and a wide variety of other metrics, can be generated by metric generation logic 198.

Similarly, the information from other sensors or other inputs can be used as well. For instance, if radiation sensor 138 provides an output indicative of the crop properties (such as moisture) crop property generation logic 191 outputs an indication of crop moisture to metric generation logic 198. Metric generation logic 198 can use this to enhance the CSPS metric that it generates, because the crop moisture may affect the CSPS metric that is generated.

The metrics can be output to data store 168 where they can be stored as kernel metric values 210. Map information can be provided from sensors 170 or downloaded from a remote system and stored as map 212 in data store 168 as well.

The information can be output to communication system 169 so that it can be communicated to any of a wide variety of other remote systems. Similarly, the information is illustratively provided to control system 164.

Metric evaluation logic 175 illustratively receives the generated metrics from metric generation logic 198 and evaluates them to determine whether control system 164 is to generate control signals to adjust any operating subsystems on forage harvester 100. For instance, logic 175 may receive a CSPS metric (or another metric) and compare it to a desired metric value to determine whether the CSPS metric value that was just measured based upon the captured image is outside of a desired range. As an example, it may be too high, in which case extra fuel may be consumed in the kernel processing operation, thus leading to inefficiency or, it may be too low leading to a reduced quality of processed crop-silage.

If the metric is outside of an accepted range, as indicated by metric evaluation logic 175, then it indicates this to other components in control system 164 so that adjustments can be made. In one example, operator interface controller 182 controls operator interface mechanisms 162 to surface the metrics for the operator, and to surface the results output by metric evaluation logic 175. Thus, it can surface an indication of the CSPS value (over time) so that the operator can make desired adjustments. It can also illustratively surface suggested adjustments that can be made by the operator in order to bring the CSPS value back into a desired range.

Gap controller 176 can receive the evaluation output from logic 175 and automatically control actuator 122 to change the gap distance "d" based on the evaluation result. For instance, if the CSPS score is too high, it may control actuator 122 to increase the gap size "d". if the CSPS metric is too low, then it may control actuator 122 to decrease the gap size "d". Similarly, by changing the speed differential of rollers 118 and 120, the grinding effect that the rollers have on the crop traveling between them can be increased or decreased.

Thus, for instance, it may be that gap controller 176 does not change the setting on actuator 122, but instead motor speed controller 178 controls motors 172 and 174 to increase or decrease the speed differential between rollers 118 and 120, based upon the CSPS value. Also, controllers 176 and 178 can operate together. For instance, it may be that decreasing the gap size "d" will undesirably decrease the fuel efficiency. In that case, the roller speed differential may be changed. Similarly, it may be that the gap controller 176 has already controlled actuator 122 so that the gap size d is as small as it can be (or as large as it can be) given the mechanical setup of the rollers 118 and 120. In that case, in order to modify the CSPS value further, it may be that the motor speed of motors 172 and 174 needs to be adjusted to increase (or decrease) the speed differential.

Other settings adjustment controller 186 can control other settings as well. For instance, it can control other controllable subsystems 163 which can include, as examples, a propulsion/steering subsystem that controls the propulsion and steering of machine 100. Subsystems 163 can also include header speed and length of cut actuators that control the header speed and length of crop cut by the header 108. These variables can also affect the distribution of kernel fragment size and can thus be controlled. Also, for instance, it may be that the ground speed of harvester 100 can be increased (or decreased) based on the evaluated metrics. In addition, it may be that the control system 164 can generate control signals to control various controllable subsystems in anticipation of conditions that are about to be encountered. By way of example, assume that map 212 is a yield map indicating the expected yield through a field being harvested. Where harvester 100 is approaching an area of the field where the yield will be increased, then gap controller 176 may modify the gap size "d", and/or motor speed controller 178 can modify the speed differential between the rollers 118 and 120, based upon the anticipated volume of material that will be traveling between the rollers. In another example, when the CSPS value is mapped to the field, then the control signals can be generated based on CSPS values saved during the previous pass over the field. On the next adjacent pass, the control signals can be estimated ahead of time. These and other control operations can be performed as well.

Figure 3:
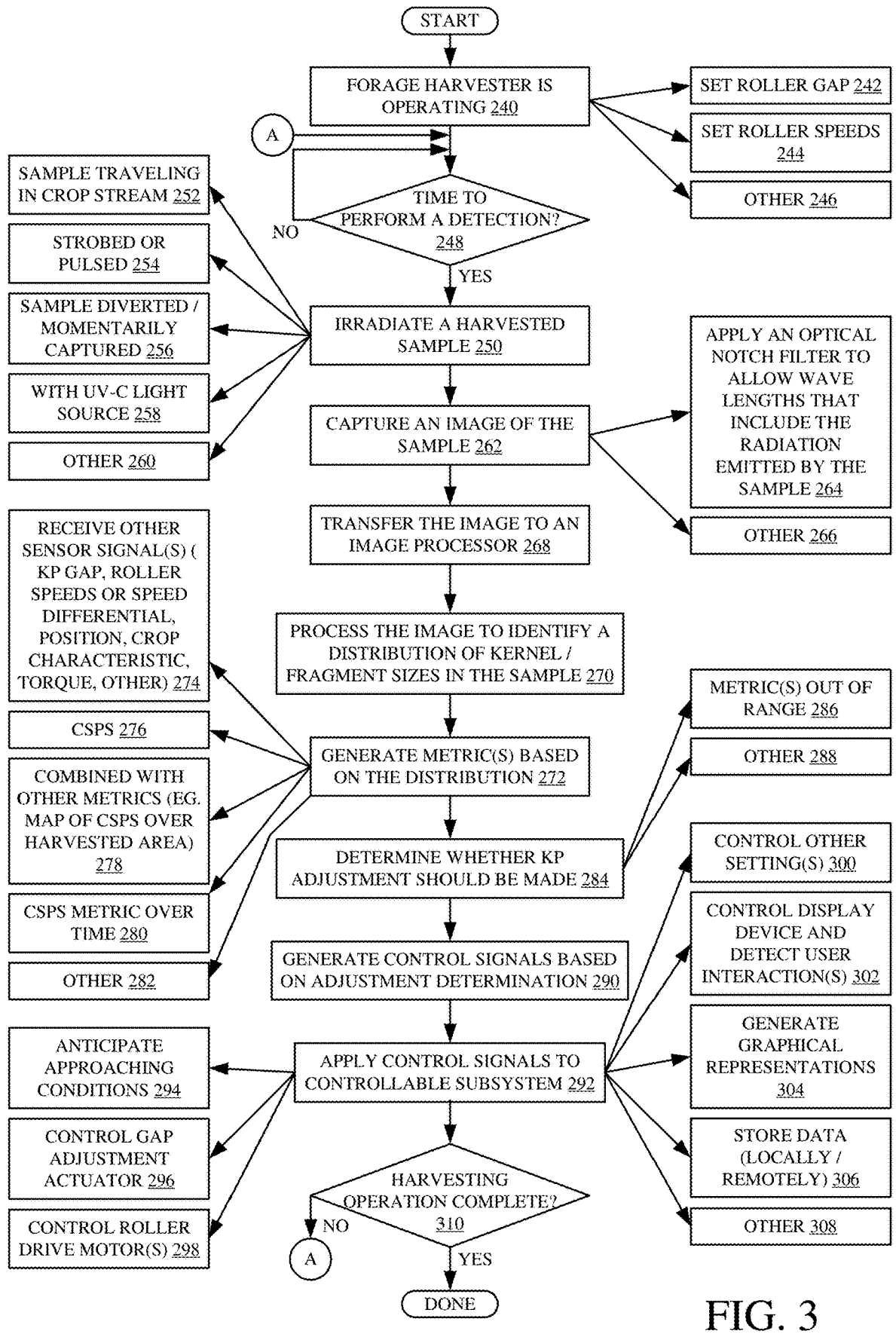
FIG. 3 is a flow diagram illustrating the operation of a kernel processing unit in the forage harvester illustrated in FIGS. 1 and 2.

FIG. 3 is a flow diagram illustrating one example of the operation of forage harvester 100 in processing kernels. FIGS. 1-3 will now be described in conjunction with one another. It is first assumed that forage harvester 100 is operating or is operational. This is indicated by block 240 in the flow diagram of FIG. 3. In one example, gap controller 176 has generated control signals to control actuator 122 to set the roller gap "d" between rollers 118 and 120. This is indicated by block 242. Motor speed controller 178 has also generated control signals to set the speeds of motors 172-174. This is indicated by block 244. Forage harvester 100 can be operating in other ways as well, and this is indicated by block 246.

At some point, control system 164 determines whether it is time to perform a detection operation in order to capture an image from a crop sample 160. This is indicated by block 248. This can be done in a wide variety of different ways. For instance, it may be that the samples are continuously captured or are captured at periodic intervals. In another example, it may be that the images are captured only when certain criteria are detected (such as a change in crop moisture, a change in crop yield, a change in fuel consumption, etc.).

Once it is determined that a detection operation is to be performed at block 248, then radiation source 180 and image device controller 184 control radiation source 136 and imaging device 140 to capture an image of a crop sample 160. For example, radiation source 136 can be controlled to irradiate (or illuminate) the harvested sample 160 as indicated by block 250. In one example, while the shutter of device 140 is open, radiation source 136 is pulsed or strobed to illuminate sample 160 (and thus to effectively freeze its motion, optically), as it travels. The radiation need not necessarily be pulsed or strobed. Instead, crop sample 160 can be diverted out of chute 128 and momentarily capture, in a capturing chamber, where the image is taken before the sample 160 is again released into chute 128. This is indicated by block 252. Strobing or pulsing source 136 is indicated by block 254. Sampling a diverted and momentarily captured crop sample is indicated by block 256. Irradiating the crop sample 160 with a UV-C light source is indicated by block 258. The irradiation can be performed in other ways as well, and this is indicated by block 260.

Imaging device controller 184 then controls imaging device 140 to capture the image of crop sample 160. This is indicated by block 262 in the flow diagram of FIG. 3. As discussed above, an optical notch filter 158 can be used to allow imaging device 140 to receive the wavelengths that include the fluorescent radiation emitted by the sample 160 under irradiation by radiation source 136. This is indicated by block 264. The image can be captured in other ways as well, and this is indicated by block 266.

Imaging device 140 then transfers the image to image processing system 166. This can be done over a controller area network (CAN) bus, it can be done wirelessly, or it can be done in other ways. Transferring the image to an image processor is indicated by block 268 in the flow diagram of FIG. 3.

Image processing system 166 then processes the image to identify a distribution of kernel/fragment sizes in the crop sample 160. This is indicated by block 270. One example of this is described in greater detail below with respect to FIGS. 4-4C.

Metric generation logic 198 generates one or more metrics based upon the size distribution. This is indicated by block 272. By way of example, it can receive other sensor signals from other sensors, such as the size of gap "d", a roller speed sensor signal that indicates the speed of rollers 118 and 120, or the speed differential of rollers 118 and 120, geographic position of harvester 110 (such as from a GPS receiver), crop characteristics based upon information received from radiation sensor 138, or other sensors and generated by crop property generation logic 191, torque from torque sensors 216 and 218, or any of a wide variety of other sensor signals. Receiving other sensor signals to generate metrics based upon the kernel or fragment size distribution is indicated by block 274 in the flow diagram of FIG. 3.

Logic 198 can generate a CSPS value for sample 160. This is indicated by block 276. The CSPS value can be combined with other metrics (such as positional information), to map the CSPS value over a harvested area. This is indicated by block 278. The CSPS value (or other metric) can be aggregated over time to identify how the value is changing over time. By way of example, in the morning, the crop moisture may be higher and in the afternoon it may be lower. Thus, the CSPS value for a crop (even within a single field under similar conditions) may change over the day. Generating the CSPS metric and aggregating it over time (or showing how it changes over time) is indicated by block 280. The metrics can be generated based upon the size distribution of the kernels or fragments in a wide variety of other ways as well, and this is indicated by block 282.

Metric evaluation logic 175 then determines whether any kernel processing or other adjustments should be made based upon the metrics received from metric generation logic 198. Determining whether any adjustments are to be made is indicated by block 284 in the flow diagram of FIG. 3. For instance, logic 178 can compare the metric values received from logic 198 to determine whether they are out of a desirable range. The range can be preset, or it can be set based upon sensed criteria (such as crop type, location, etc.). The range can change dynamically (such as based on time of day, based on other sensed characteristics such as crop moisture, soil conditions, field topology, etc.). Determining whether an adjustment is needed by determining whether the sensed metrics are inside or outside of a desired range is indicated by block 286. Determining whether any adjustments are to be made based upon the metrics output by logic 198 can be done in a wide variety of other ways as well. This is indicated by block 288.

Control system 164 then generates control signals based upon the adjustment determination. This is indicated by block 290 in the flow diagram of FIG. 3. For instance, gap controller 176 can generate control signals to control actuator 122 to modify the size of the gap "d". Motor speed controller 178 can generate control signals to control the speed of motors 172 and 174 to thus control the speed differential of rollers 118 and 120. Operator interface controller 182 can generate control signals to control operator interface mechanisms 162. Other logic can control other controllable subsystems.

The control system 164 then applies the control signals to the controllable subsystems in order to control harvester 100 based upon the evaluation result generated by metric evaluation logic 175. Applying the control signals to the controllable subsystems is indicated by block 292.

By way of example, control system 164 can receive map information 212 and kernel metric values 210 that were stored during a previous pass in the field. It can generate control signals in anticipation of approaching areas that correspond to those kernel metric values 210 (e.g., to the CSPS values generated at similar locations in the previous pass). Generating the control signals and applying them in anticipation of approaching conditions is indicated by block 294 in the flow diagram of FIG. 3. Gap controller 176 can generate control signals to control actuator 122 to control the size of gap "d". This is indicated by block 296. Motor speed controller 178 can generate control signals to control the speed of motors 172 and 174. This is indicated by block 298. Other settings adjustment controller 186 can generate control signals to control other settings or other controllable subsystems. This is indicated by block 300.

Operator interface controller 182 can apply the control signals to control operator interface mechanisms 162. This is indicated by block 302. Operator interface controller 182 can control operator interface mechanisms 162 to generate graphical representations of the values in various ways, such as those discussed above. This is indicated by block 304. In addition, it can overlay colors on various images to indicate the size and shape of kernels, where they have been detected by image processing system 166. The image processor may generate different colors that can be overlaid on fragments that are considered to be over or under the size threshold for evaluation logic 175. A relatively continuous color palette can also be used to denote a range of different fragment sizes. These and other graphical representations can be generated, as indicated by block 304.

All of the information can be stored in data store 168, and it can be communicated to other, remote systems by communication system 169 where it can be stored and analyzed further. This is indicated by block 306. The control signals can be applied to controllable subsystems in a wide variety of other ways as well, and this is indicated by block 308.

In one example, the images are captured, and processed, and metrics are generated, as long as the harvest operation is continuing. This is indicated by block 310 in the flow diagram of FIG. 3.

Figure 4:
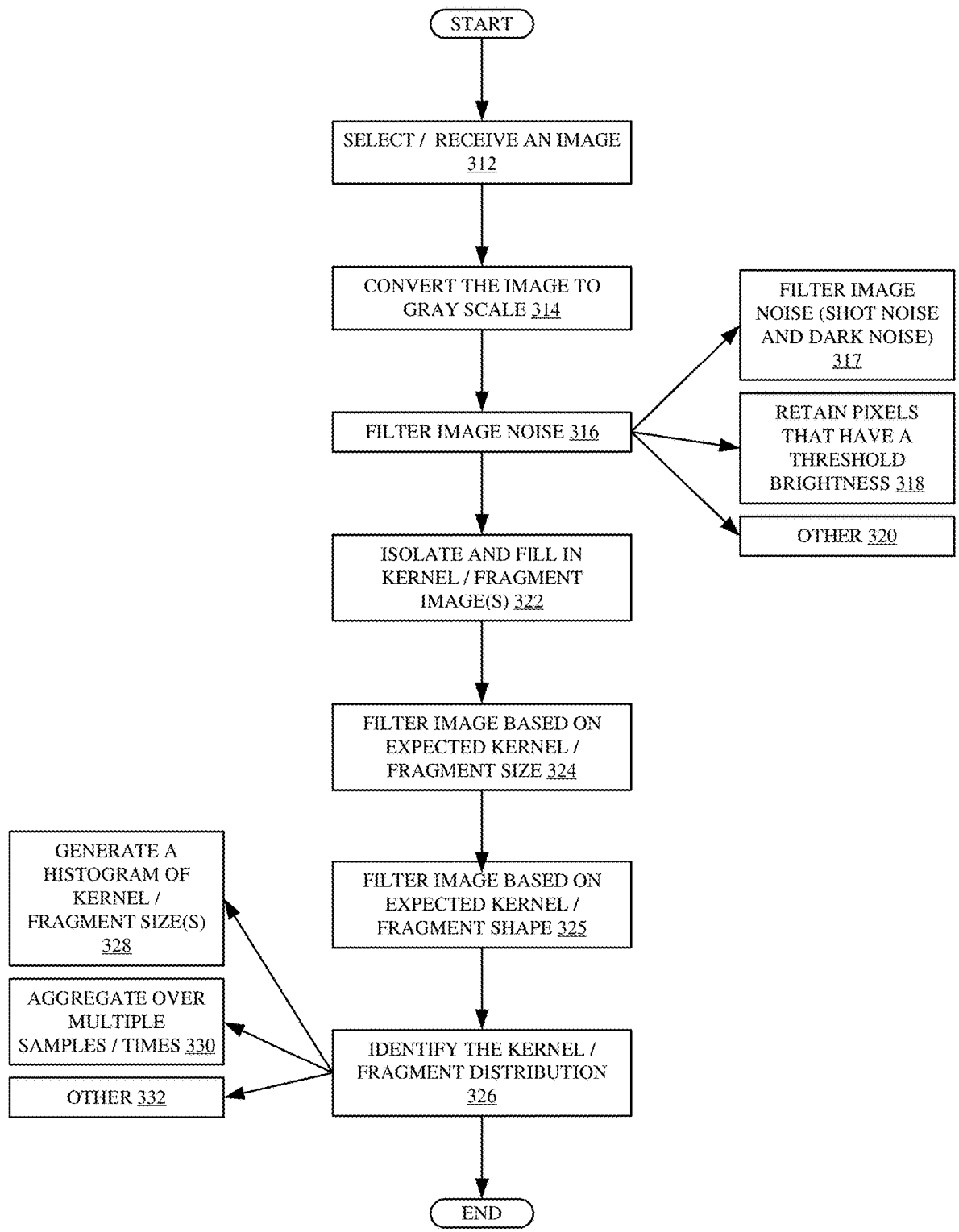
FIG. 4 is a flow diagram illustrating how an image is processed.
Figure 4A:
FIGS. 4A-4C show examples of images.

FIG. 4 is a flow diagram illustrating one example of the operation of image processing system 166, in more detail. In one example, image processing system 166 first receives an image to be processed from imaging device 140, or from memory, or elsewhere. This is indicated by block 312 in the flow diagram of FIG. 4. FIG. 4A shows one example of such an image.

Noise filter logic 190 then illustratively converts the image to a greyscale image, as indicated by block 314, and then filters image noise, from the image. This is indicated by block 316. For instance, the image may have shot noise and dark noise which may be forms of electronic noise that can cause unwanted variation in image brightness or color. The noise is filtered, as indicated by block 317, to obtain filtered pixels, in which there may be certain pixels in the image that have a brightness level that passes a brightness threshold. In that case, those images may well be representative of kernel fragments. Therefore, those pixels that have a brightness level that exceeds the brightness threshold may be retained, while other pixels are eliminated from further processing. This is indicated by block 318. Image noise can be filtered, and the pixels can be segmented based on brightness, in a wide variety of other ways as well. This is indicated by block 320.

Pixel enhancement logic 192 then isolates the pixels that represent a single fragment, and fills in the interior of the fragment represented by those pixels. For instance, it may be that a fragment in the image has a bright periphery but a relatively dark spot in the middle. However, if it is identified as a fragment, after the noise has been eliminated, then enhancement logic 192 enhances that set of pixels (representing a kernel fragment) to fill in the darkened central portion with enhanced pixel values indicating a threshold level of brightness. Isolating and filling in kernel/fragment images is indicated by block 322.

Figure 4B:
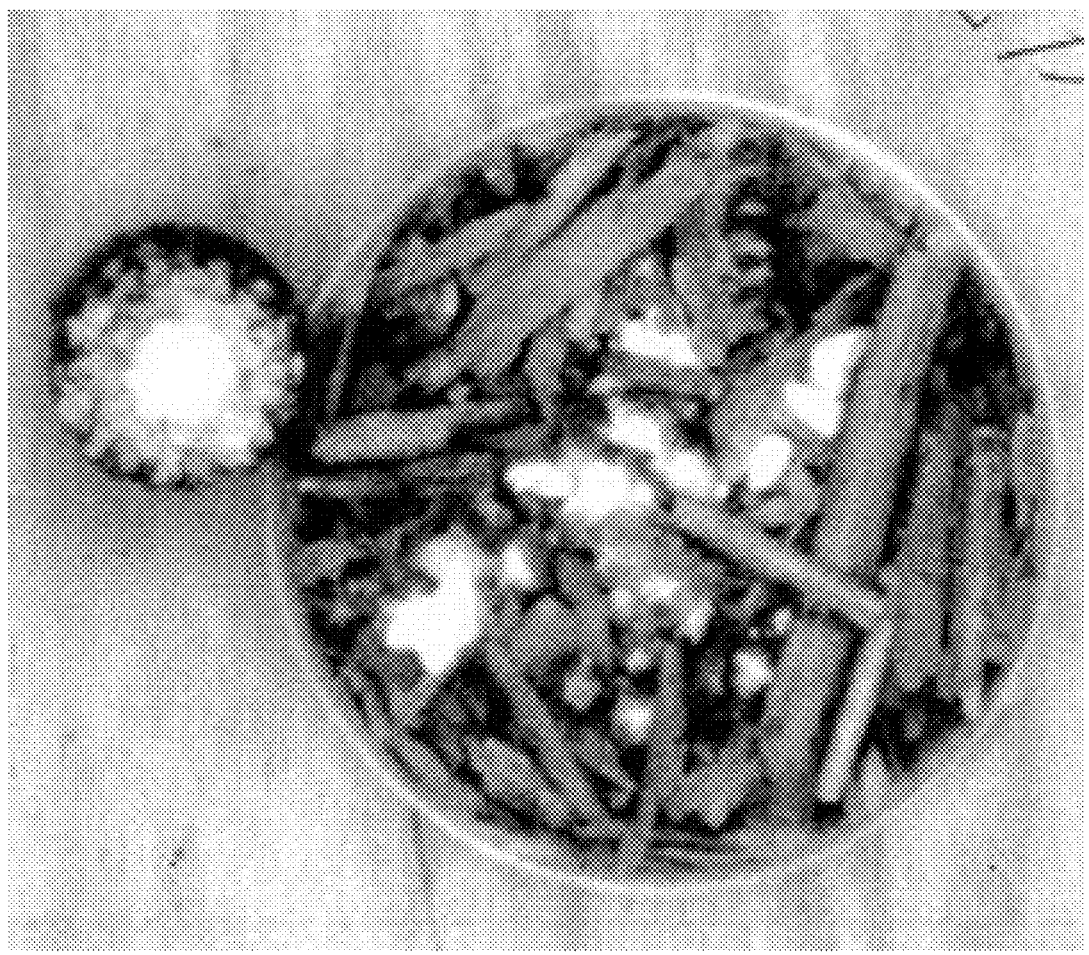
Figure 4C:
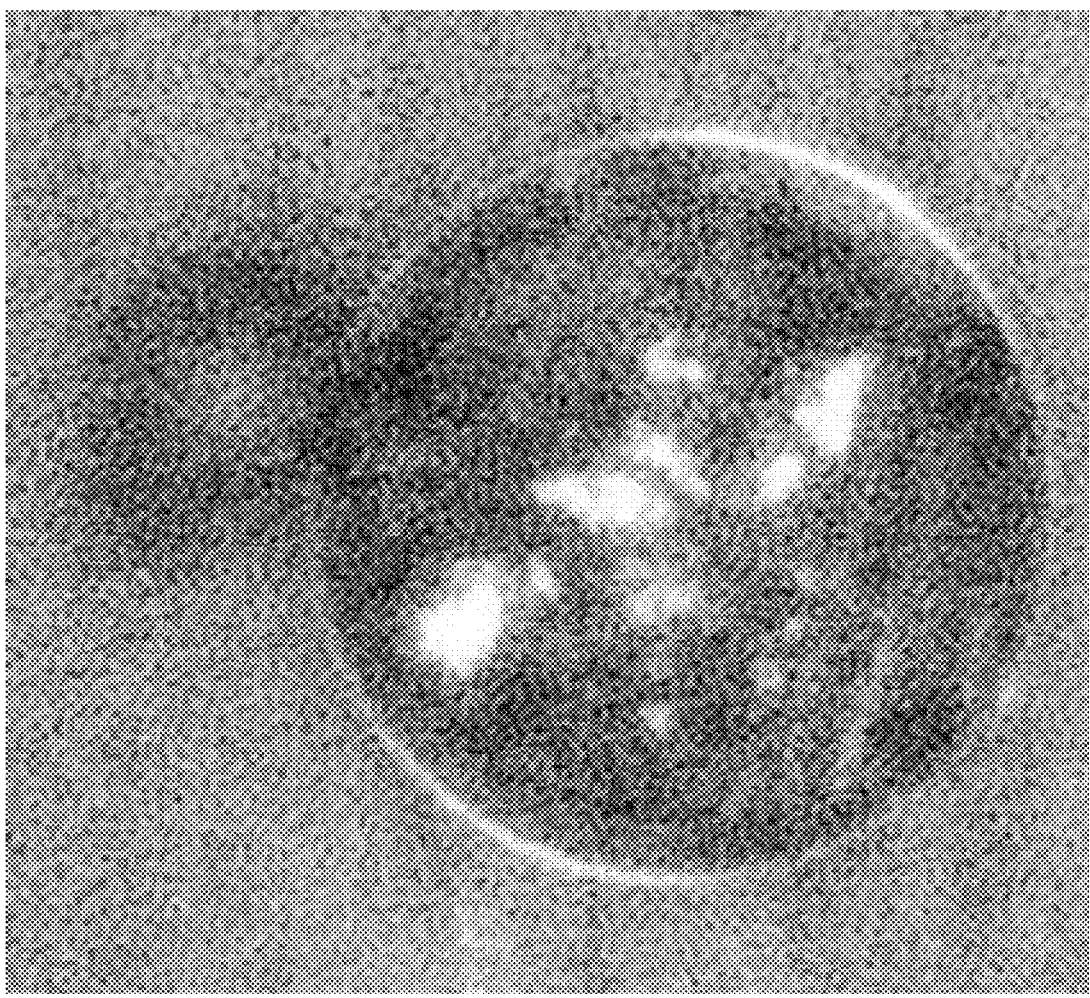

Size filtering logic 194 then filters the pixels or image based upon an expected kernel/fragment size. For instance, it may be that the system is configured to expect a minimum fragment size, and/or a maximum fragment or kernel size. If a set of pixels that has been identified as a kernel or a fragment is outside of the expected range (e.g., by a threshold amount), then that portion of the image may be filtered out as well. Filtering the image based upon expected kernel/fragment size is indicated by block 324 in the flow diagram of FIG. 4. FIG. 4B shows one example of an enhanced image, and FIG. 4C shows one example of an enhanced greyscale image that has been filtered based upon expected kernel size.

Shape filtering logic 195 can then filter the pixels or image based on shape. For instance, particles that are plant material (as opposed to kernels or kernel fragments) tend to be quite rectangular in shape, whereas kernel fragments tend to appear generally circular, or more smoothly curved. Logic 195 thus generates a metric indicative of the circularity or smoothness of curve of the perimeter of the shapes. It filters those shapes that are likely not kernels or kernel fragments based on that metric.

Having thus identified kernels and fragments within the image, size distribution identification logic 196 identifies the kernel and fragment size distribution within the image. For instance, it illustratively identifies a number of pixels that makes up each identified kernel or fragment in the image and sorts them based upon size. The number of pixels can be transformed into a physical size based on a known geometry of the system or in other ways. Identifying the kernel/fragment size distribution is indicated by block 326.

In one example, generating the size distribution can be done by generating a histogram of the various kernel and fragment sizes, and integrating under the histogram to obtain the size distribution. This is indicated by block 328. Logic 196 can also aggregate the size distribution over multiple crop samples, and/or over multiple time periods. This is indicated by block 330. It can identify the kernel/fragment size distribution in a wide variety of other ways as well. This is indicated by block 332.

Figure 5A:
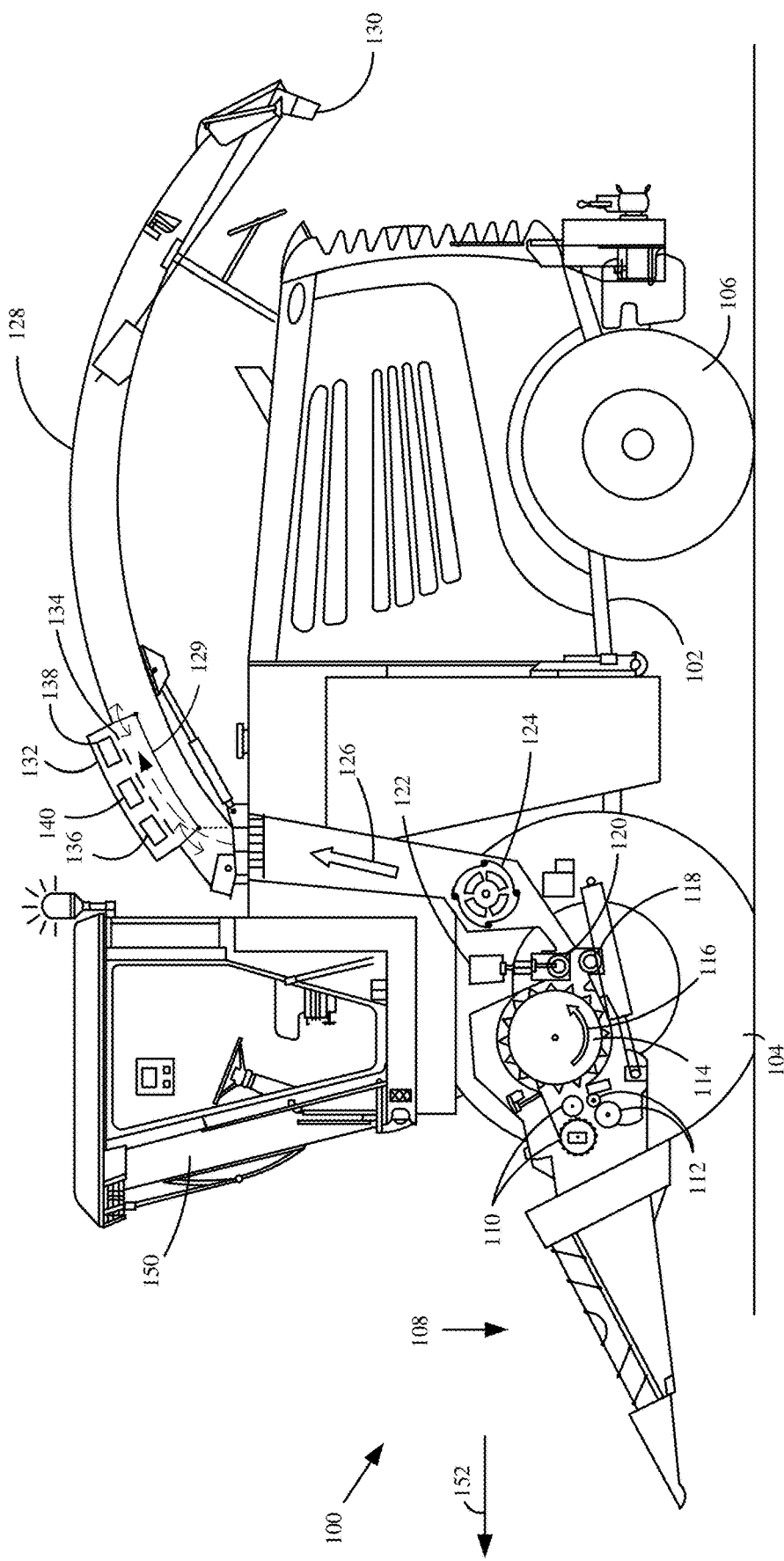
FIG. 5A is a partial pictorial, partial schematic view of another example of a forage harvester.
Figure 5B:
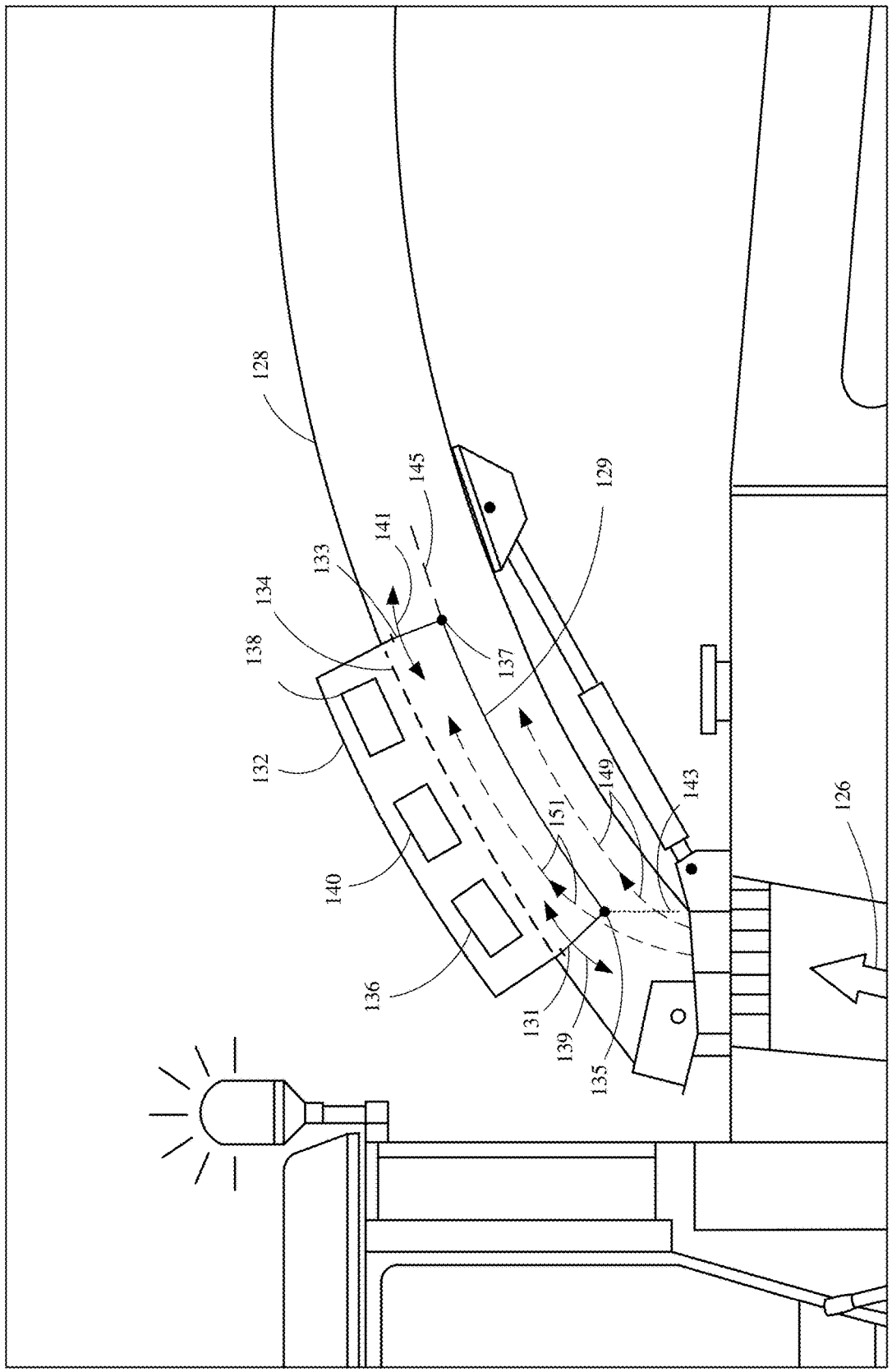
FIG. 5B shows a portion of FIG. 5A in more detail.

FIG. 5A show another example of harvester 100. FIG. 5A is similar to FIG. 1 and similar items are similarly numbered. However, FIG. 5A shows that the chute 128 has a bypass chamber 133 disposed therein. FIG. 5B shows an example of bypass chamber 129 in more detail.

It can be seen in FIG. 5B that bypass chamber 129 has an inlet door 131 and an exit door 133 Doors 131 and 133 can be controlled by actuators (not shown) to rotate about pivot points 135 and 137, respectively, as indicated by arrows 139 and 141, to move between an open position and a closed position. The open position for door 131 is illustrated by dashed line 143, and the open position for door 133 is illustrated by dashed line 145.

When door 131 is in the closed position, crop moving in the direction indicated by arrow 126 is directed by the airflow along the path indicated by arrow 149, along chute 128. However, when doors 131 and 133 are in the open positions, the crop moving in the direction indicated by arrow 126 is diverted into the bypass chamber 129 as indicated by arrow 151. After a sample of crop has entered bypass chamber 129, doors 131 and 133 can again be closed to capture a sample of crop in bypass chamber 129, where it can be subjected to still sample analysis. In that case, an image can be captured and analyzed as discussed above. Once the image is captured, door 133 can again be opened so the trapped crop sample can exit bypass chamber 129 (e.g., so the next time door 131 is opened, the trapped crop sample will be driven from bypass chamber 129) through chute 128.

Also, when the crop sample is trapped in the bypass chamber 129, it may be that the image is captured using imaging in the visible light spectrum. Thus, the radiation source 138 may be a source of visible light and the image capture device 140 may capture an image using radiation in the visible light spectrum. In that case, the image can be analyzed using optical analysis and processing (such as shape identification and/or filtering, size identification and/or filtering, texture analysis, and/or other image analysis and processing). Further, values generated from a plurality of still images taken from a plurality of captured crop samples can be averaged or otherwise aggregated or combined to obtain a more accurate kernel fragment size distribution.

It will also be noted that the mechanisms described above can be used in conjunction with one another or in various combinations. For instance, still sampling can be used with either visual light imaging or imaging in another light spectrum or the two can be combined. Also, various forms of image processing discussed above, and/or other types of image processing, can be used alone or in various combinations. Further, still sampling can be performed in a wide variety of different ways, and the bypass chamber discussed above is only one example.

It can thus be seen that the present description greatly enhances the operation of the machine itself. The processing logic can be performed by an image processor or other processor in the kernel processing module in machine 100, itself, or elsewhere. The metrics are generated, as the harvesting operation is being performed. Therefore, the harvester can be adjusted, during the operation, in order to achieve a desired kernel/fragment size, and thus in order to achieve a desired silage quality (or other harvested crop quality).

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, controllers and/or servers. In one embodiment, the processors, controllers and/or servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the FIGS. show a number of blocks with functionality ascribed to each block. It will be noted that fewer blocks can be used so the functionality is performed by fewer components. Also, more blocks can be used with the functionality distributed among more components.

Figure 6:
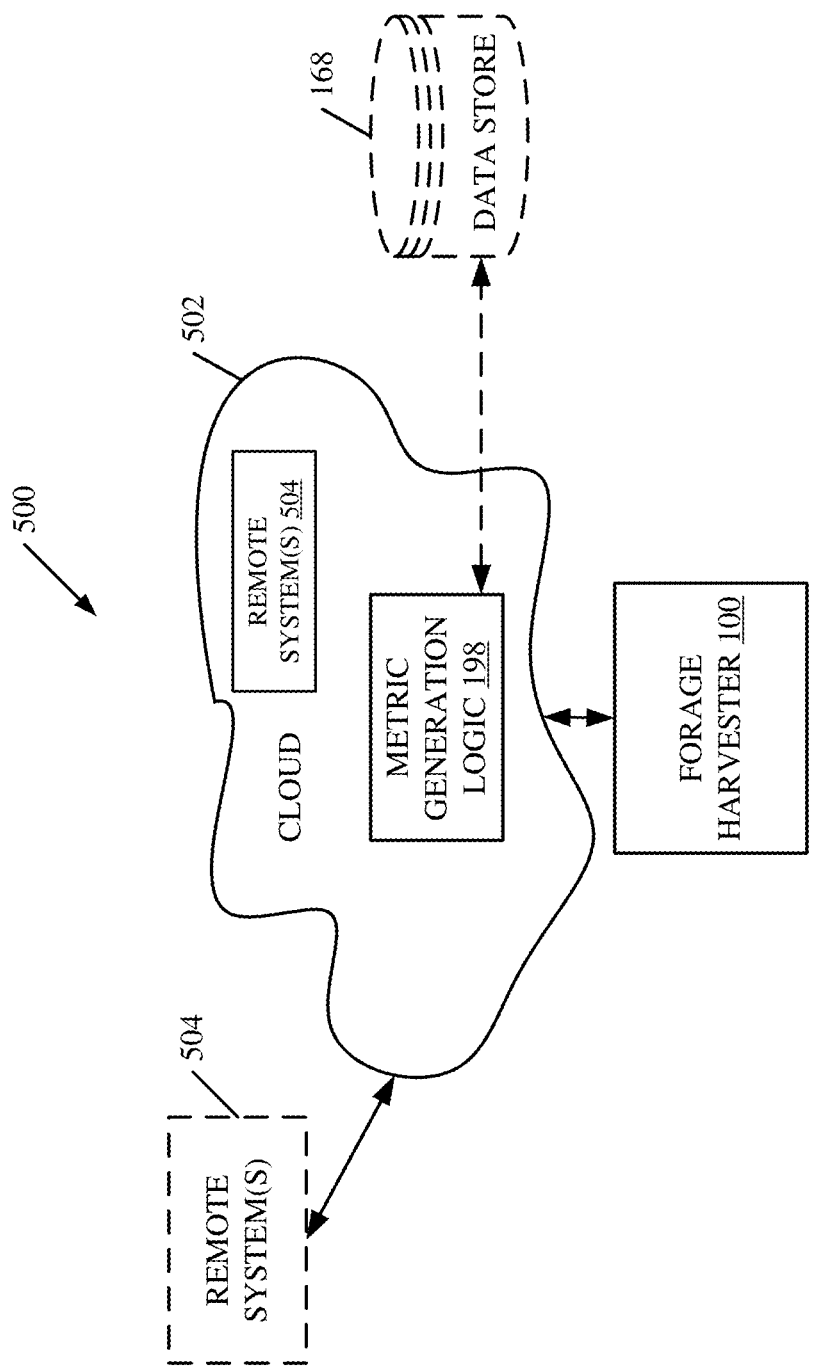
FIG. 6 is a block diagram showing one example of the forage harvester operating in a remote server environment.

FIG. 6 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIGS. 1 and 2 and they are similarly numbered. FIG. 6 specifically shows that metric generation logic and/or remote systems 504 can be located at a remote server location 502. Therefore, harvester 100 accesses those systems through remote server location 502.

FIG. 6 also depicts another example of a remote server architecture. FIG. 5 shows that it is also contemplated that some elements of FIGS. 1 and 2 are disposed at remote server location 502 while others are not. By way of example, data store 168 or remote system 504 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIGS. 1 and 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
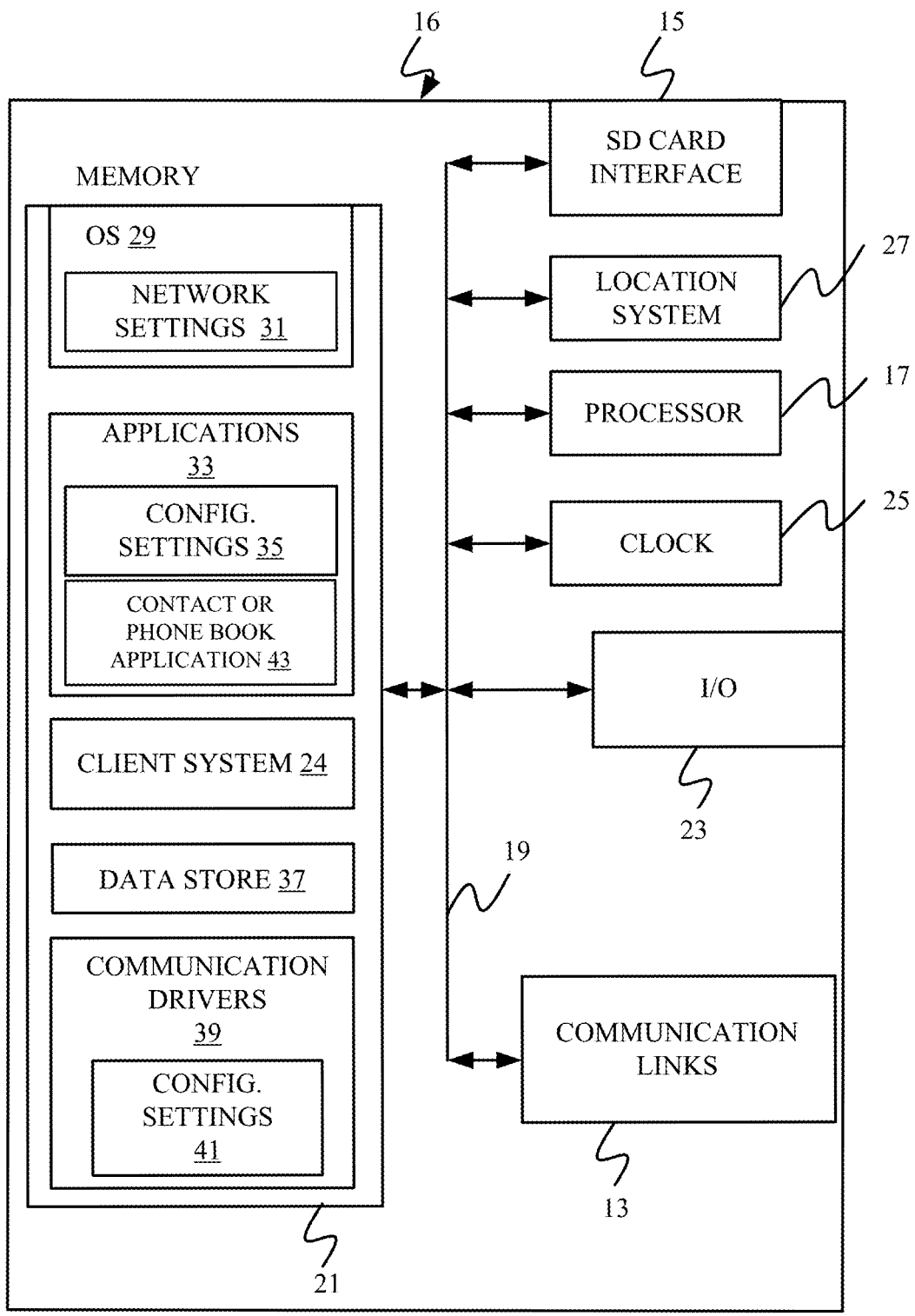
FIGS. 7-9 show examples of mobile devices that can be used in the forage harvester and architectures shown in the previous FIGS.
Figure 8:
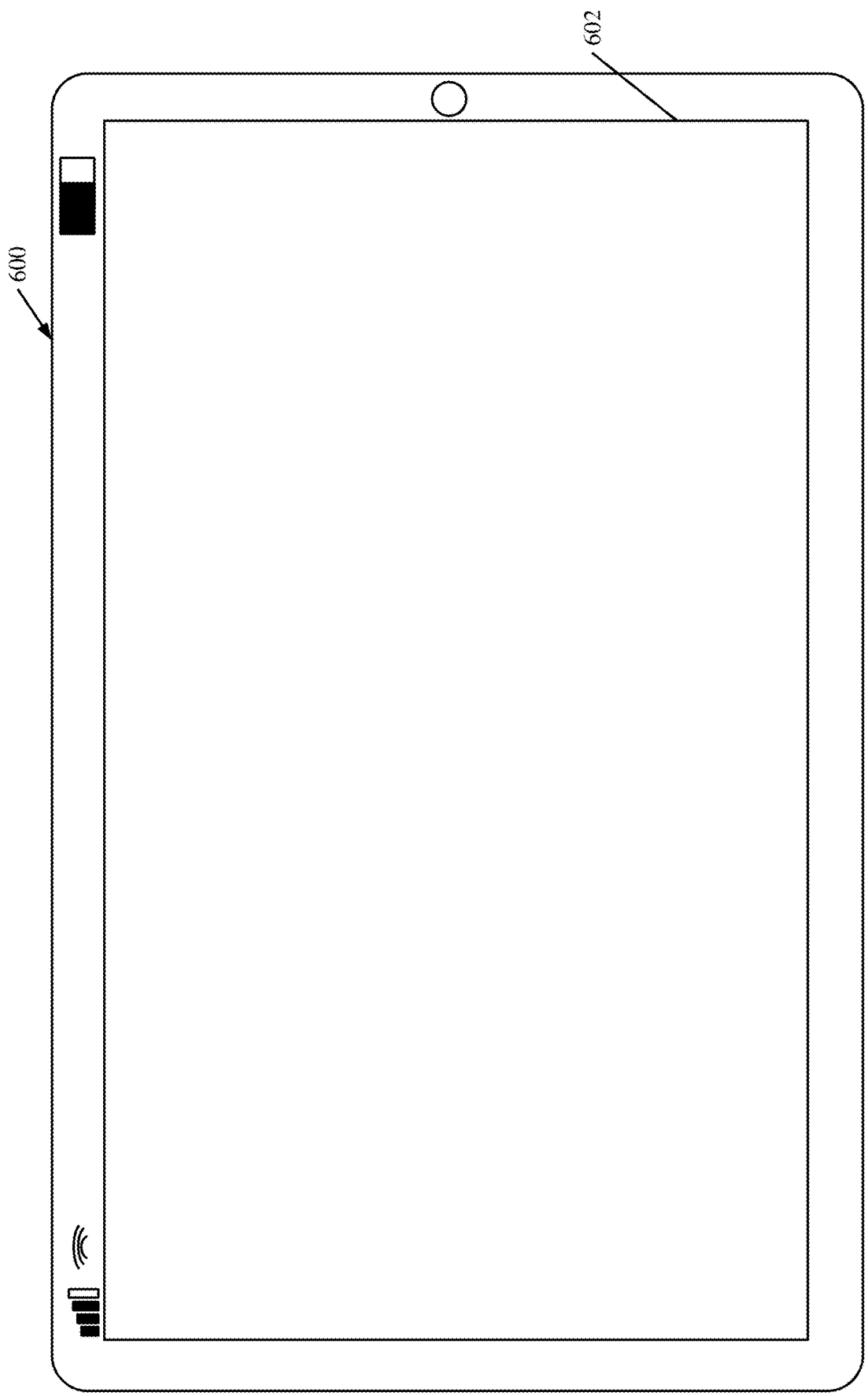
Figure 9:
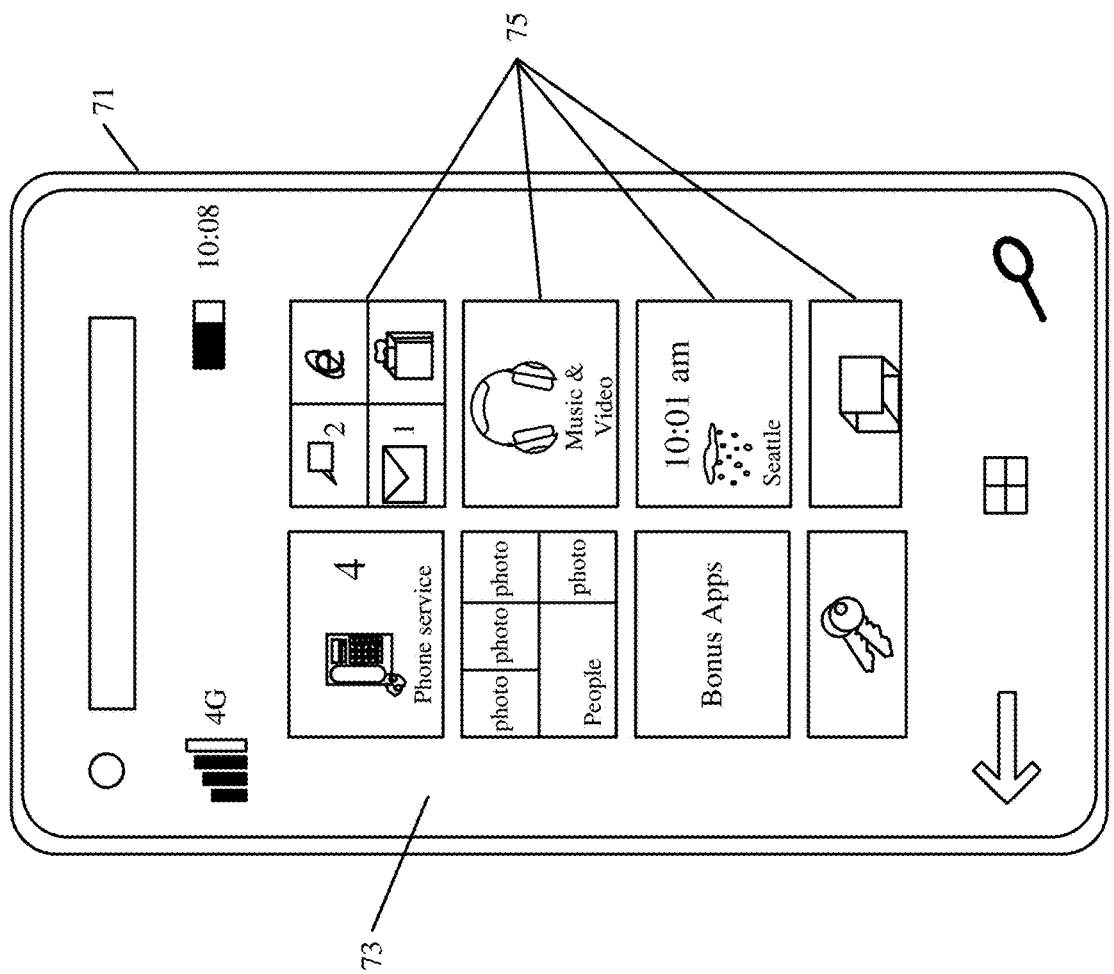
Figure 10:
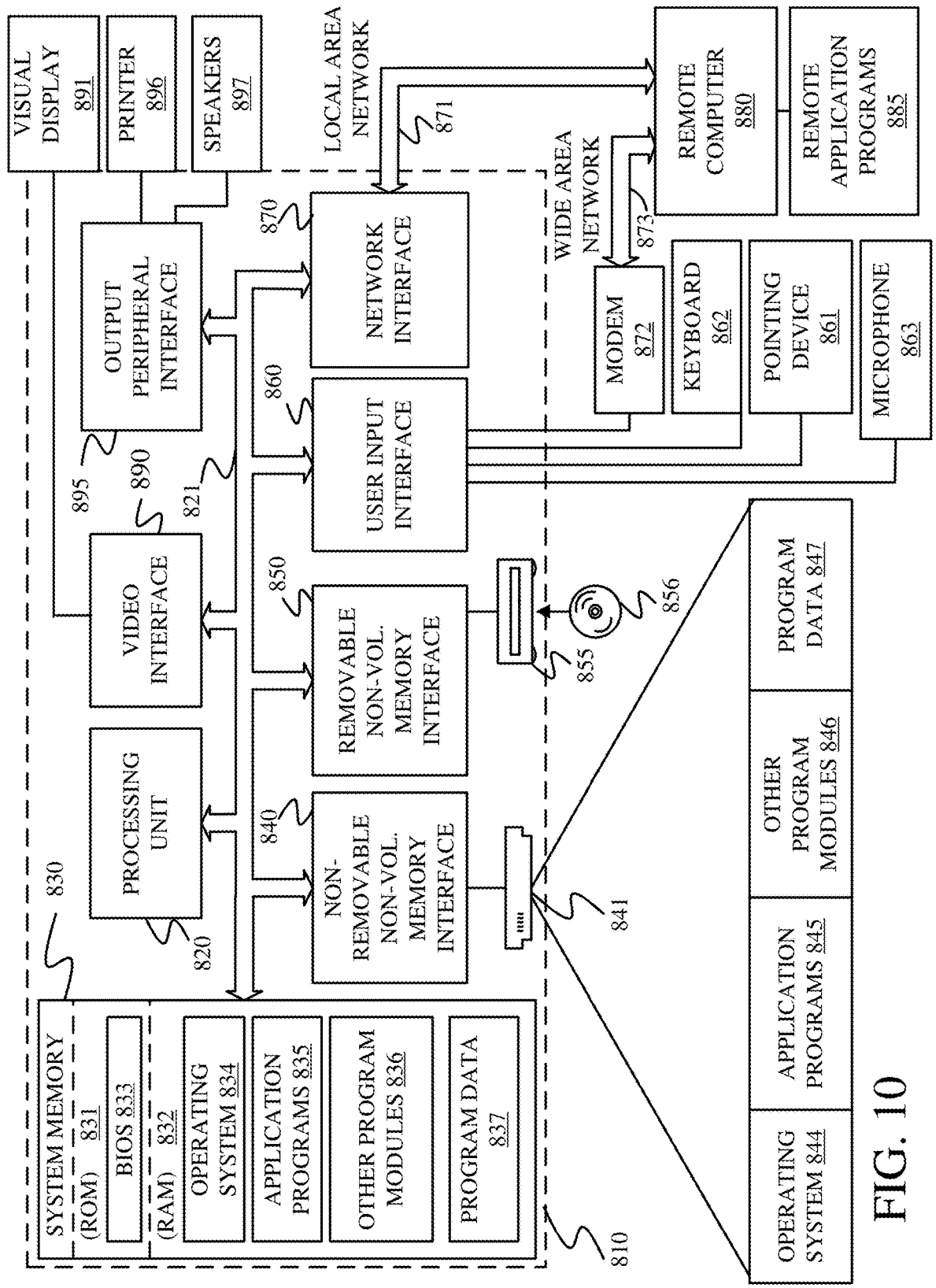
FIG. 10 is a block diagram of one example of a computing environment that can be used in the architectures shown in the previous FIGS.

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the kernel processor roller gap "d". FIGS. 8-10 are examples of handheld or mobile devices.

FIG. 7 provides a general block diagram of the components of a client device 16 that can run some components shown in FIGS. 1 and 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors FIG. from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 10 is one example of a computing environment in which elements of FIGS. 1 and 2, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1 and 2 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

Example 1 is a forage harvester, comprising:

a chopper that receives severed crop and chops it into pieces;

a kernel processing unit that includes a first kernel processing roller and a second kernel processing roller separated from the first kernel processing roller by a gap;

a first drive mechanism driving rotation of the first kernel processing roller;

a second drive mechanism driving rotation of the second kernel processing roller;

an imaging device that captures an image of processed crop that has been processed by the kernel processing unit, the image indicating kernel fragment radiation fluoresced by kernel fragments in the processed crop;

an image processing system that identifies sizes of the kernel fragments in the image based on the indication of kernel fragment radiation fluoresced by the kernel fragments; and a control system that generates a control signal to control the first drive mechanism to control a speed differential between the first and second kernel processing rollers based on the identified sizes of the kernel fragments.

Example 2 is the forage harvester of any or all previous examples and further comprising:

a roller position actuator that drives movement of one of the first and second kernel processing rollers relative to another of the first and second kernel processing rollers to change a size of the gap.

Example 3 is the forage harvester of any or all previous examples wherein the control system comprises:

a gap controller configured to generate a gap control signal to control the roller position actuator to change the size of the gap based on the identified sizes of the kernel fragments.

Example 4 is the forage harvester of any or all previous examples and further comprising:

a radiation source configured to emit source radiation at a source wavelength that causes the kernel fragments to fluoresce the kernel fragment radiation at a fluoresced wavelength; and a radiation source controller configured to control the radiation source to emit the source radiation.

Example 5 is the forage harvester of any or all previous examples and further comprising:

a notch filter optically disposed between the kernel fragments and the imaging device and configured to filter radiation outside a range of wavelengths that is centered on the fluoresced wavelength.

Example 6 is the forage harvester of any or all previous examples wherein the radiation source comprises a source of ultraviolet C radiation centered on 254 nanometers.

Example 7 is the forage harvester of any or all previous examples wherein the notch filter is configured to pass radiation centered on 335 nanometers.

Example 8 is the forage harvester of any or all previous examples wherein the image processing system comprises:

noise filter logic that identifies image noise in the image and filters the pixels based on the image noise to obtain filtered pixels.

Example 9 is the forage harvester of any or all previous examples wherein the image processing system comprises:

pixel enhancement logic configured to identify sets of the filtered pixels, each set corresponding to a different kernel fragment in the image.

Example 10 is the forage harvester of any or all previous examples wherein the image processing system comprises:

size filtering logic configured to filter the sets of filtered pixels based on a kernel size, to obtain size-filtered pixels.

Example 11 is the forage harvester of any or all previous examples wherein the image processing system comprises:

size distribution identification logic configured to identify a size distribution of the kernel fragments based on the size-filtered pixels.

Example 12 is the forage harvester of any or all previous examples wherein the image processing system comprises:

metric generation logic configured to aggregate the size distribution over time to obtain an aggregated size distribution metric, the control system being configured to generate the control signal based on the aggregated size distribution metric.

Example 13 is the forage harvester of any or all previous examples and further comprising:

a geographic position sensor configured to sense a geographic position of the forage harvester and generate a position signal indicative of the sensed geographic position; and metric generation logic configured to map the size distribution to different geographic locations based on the position signal to obtain a mapped size distribution metric, the control system being configured to generate the control signal based on the mapped size distribution metric.

Example 14 is the forage harvester of any or all previous examples and further comprising:

a power consumption sensor configured to sense a power consumption variable indicative of power consumed by the kernel processing unit; and metric generator logic configured to generate a metric indicative of a change in power consumption given a change in the size of the gap or a change in the speed differential.

Example 15 is the forage harvester of any or all previous examples wherein the power consumption sensor comprises at least one of a torque sensor, configured to sense torque output by at least one of the first and second drive mechanisms, and a fuel consumption sensor, configured to sense fuel consumption of the forage harvester.

Example 16 is a method of controlling a forage harvester, comprising:

receiving severed crop at a kernel processing unit that includes a first kernel processing roller and a second kernel processing roller separated from the first kernel processing roller by a gap;

driving rotation of the first kernel processing roller and the second kernel processing roller at different speeds indicated by a speed differential;

capturing an image of processed crop that has been processed by the kernel processing unit, the image indicating kernel fragment radiation fluoresced by kernel fragments in the processed crop;

identifying sizes of the kernel fragments in the image based on the indication of kernel fragment radiation fluoresced by the kernel fragments; and generating a control signal to control the speed differential between the first and second kernel processing rollers based on the identified sizes of the kernel fragments.

Example 17 is the method of any or all previous examples and further comprising:

generating a gap control signal to control a roller position actuator to change the size of the gap based on the identified sizes of the kernel fragments.

Example 18 is the method of any or all previous examples wherein capturing an image comprises:

impinging ultraviolet C radiation, centered on approximately 254 nanometers, on the processed crop;

filtering radiation, received from the processed crop, outside a range of wavelengths that is centered on approximately 335 nanometers, to obtain filtered radiation and wherein identifying the sizes of the kernel fragments comprises identifying the sizes of the kernel fragments based on the filtered radiation.

Example 19 is a forage harvester, comprising:

a chopper that receives severed crop and chops it into pieces;

a kernel processing unit that includes a first kernel processing roller and a second kernel processing roller separated from the first kernel processing roller by a gap;

a drive mechanism driving rotation of the first and second kernel processing rollers;

a roller position actuator that drives movement of one of the first and second kernel processing rollers relative to another of the first and second kernel processing rollers to change a size of the gap;

an imaging device that captures an image of processed crop that has been processed by the kernel processing unit, the image indicating kernel fragment radiation fluoresced by kernel fragments in the processed crop;

an image processing system that identifies sizes of the kernel fragments in the image based on the indication of kernel fragment radiation fluoresced by the kernel fragments; and a control system that generates a gap control signal to control the roller position actuator to change the size of the gap based on the identified sizes of the kernel fragments.

Example 20 is the forage harvester of any or all previous examples wherein the drive mechanism comprises a first drive mechanism configured to drive rotation of the first kernel processing roller and a second drive mechanism configured to drive rotation of the second kernel processing roller and wherein the control system comprises:

a speed controller configured to generate a speed control signal to control a speed differential between the first and second kernel processing rollers based on the identified sizes of the kernel fragments.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A forage harvester comprising:
   a chopper that receives severed crop and chops it into pieces;
   a kernel processing unit that includes a first kernel processing roller and a second kernel processing roller separated from the first kernel processing roller by a gap;
   a first drive mechanism driving rotation of the first kernel processing roller;
   a second drive mechanism driving rotation of the second kernel processing roller;
   an imaging device that captures an image of processed crop that has been processed by the kernel processing unit, the image indicating kernel fragment radiation fluoresced by kernel fragments in the processed crop;
   an image processing system that identifies sizes of the kernel fragments in the image based on the indication of kernel fragment radiation fluoresced by the kernel fragments; and
   a control system that generates a control signal to control the first drive mechanism to control a speed differential between the first and second kernel processing rollers based on the identified sizes of the kernel fragments.

2. The forage harvester of claim 1 and further comprising:
   a roller position actuator that drives movement of one of the first and second kernel processing rollers relative to another of the first and second kernel processing rollers to change a size of the gap.

3. The forage harvester of claim 2, wherein the control system comprises:
   a gap controller configured to generate a gap control signal to control the roller position actuator to change the size of the gap based on the identified sizes of the kernel fragments.

4. The forage harvester of claim 1 and further comprising:
   a radiation source configured to emit source radiation at a source wavelength that causes the kernel fragments to fluoresce the kernel fragment radiation at a fluoresced wavelength; and
   a radiation source controller configured to control the radiation source to emit the source radiation.

5. The forage harvester of claim 4 and further comprising:
   a notch filter optically disposed between the kernel fragments and the imaging device and configured to filter radiation outside a range of wavelengths that is centered on the fluoresced wavelength.

6. The forage harvester of claim 5, wherein the radiation source comprises a source of ultraviolet C radiation centered on 254 nanometers.

7. The forage harvester of claim 6, wherein the notch filter is configured to pass radiation centered on 335 nanometers.

8. The forage harvester of claim 1, wherein the image processing system comprises:
   noise filter logic that identifies image noise in the image and filters the pixels based on the image noise to obtain filtered pixels.

9. The forage harvester of claim 8, wherein the image processing system comprises:
   pixel enhancement logic configured to identify sets of the filtered pixels, each set corresponding to a different kernel fragment in the image.

10. The forage harvester of claim 9, wherein the image processing system comprises:
    size filtering logic configured to filter the sets of filtered pixels based on a kernel size, to obtain size-filtered pixels.

11. The forage harvester of claim 10, wherein the image processing system comprises:
    size distribution identification logic configured to identify a size distribution of the kernel fragments based on the size-filtered pixels.

12. The forage harvester of claim 1, wherein the image processing system comprises:
    metric generation logic configured to aggregate the size distribution over time to obtain an aggregated size distribution metric, the control system being configured to generate the control signal based on the aggregated size distribution metric.

13. The forage harvester of claim 11 and further comprising:
    a geographic position sensor configured to sense a geographic position of the forage harvester and generate a position signal indicative of the sensed geographic position; and
    metric generation logic configured to map the size distribution to different geographic locations based on the position signal to obtain a mapped size distribution metric, the control system being configured to generate the control signal based on the mapped size distribution metric.

14. The forage harvester of claim 3 and further comprising:
    a power consumption sensor configured to sense a power consumption variable indicative of power consumed by the kernel processing unit; and metric generator logic configured to generate a metric indicative of a change in power consumption given a change in the size of the gap or a change in the speed differential.

15. The forage harvester of claim 14, wherein the power consumption sensor comprises at least one of a torque sensor, configured to sense torque output by at least one of the first and second drive mechanisms, and a fuel consumption sensor, configured to sense fuel consumption of the forage harvester.

16. A method of controlling a forage harvester comprising:
receiving severed crop at a kernel processing unit that includes a first kernel processing roller and a second kernel processing roller separated from the first kernel processing roller by a gap;
driving rotation of the first kernel processing roller and the second kernel processing roller at different speeds indicated by a speed differential;
capturing an image of processed crop that has been processed by the kernel processing unit, the image indicating kernel fragment radiation fluoresced by kernel fragments in the processed crop;
identifying sizes of the kernel fragments in the image based on the indication of kernel fragment radiation fluoresced by the kernel fragments; and
generating a control signal to control the speed differential between the first and second kernel processing rollers based on the identified sizes of the kernel fragments.

17. The method of claim 16 and further comprising:
generating a gap control signal to control a roller position actuator to change the size of the gap based on the identified sizes of the kernel fragments.

18. The method of claim 17, wherein capturing an image comprises:
impinging ultraviolet C radiation, centered on approximately 254 nanometers, on the processed crop;
filtering radiation, received from the processed crop, outside a range of wavelengths that is centered on approximately 335 nanometers, to obtain filtered radiation and wherein identifying the sizes of the kernel fragments comprises identifying the sizes of the kernel fragments based on the filtered radiation.

19. A forage harvester comprising:
a chopper that receives severed crop and chops it into pieces;
a kernel processing unit that includes a first kernel processing roller and a second kernel processing roller separated from the first kernel processing roller by a gap;
a drive mechanism driving rotation of the first and second kernel processing rollers;
a roller position actuator that drives movement of one of the first and second kernel processing rollers relative to another of the first and second kernel processing rollers to change a size of the gap;
an imaging device that captures an image of processed crop that has been processed by the kernel processing unit, the image indicating kernel fragment radiation fluoresced by kernel fragments in the processed crop;
an image processing system that identifies sizes of the kernel fragments in the image based on the indication of kernel fragment radiation fluoresced by the kernel fragments; and
a control system that generates a gap control signal to control the roller position actuator to change the size of the gap based on the identified sizes of the kernel fragments.

20. The forage harvester of claim 19, wherein the drive mechanism comprises a first drive mechanism configured to drive rotation of the first kernel processing roller and a second drive mechanism configured to drive rotation of the second kernel processing roller and wherein the control system comprises:
a speed controller configured to generate a speed control signal to control a speed differential between the first and second kernel processing rollers based on the identified sizes of the kernel fragments.

* * * * *